(12) United States Patent
Shapiro et al.

(10) Patent No.: US 10,116,135 B1
(45) Date of Patent: Oct. 30, 2018

(54) METHOD AND APPARATUS FOR VOLTAGE CONTROL IN ELECTRIC POWER SYSTEMS

(71) Applicant: Statistics & Control, Inc., West des Moines, IA (US)

(72) Inventors: Vadim Shapiro, Clive, IA (US); Ilya Markevich, West Des Moines, IA (US); Dmitriy Khots, Omaha, NE (US)

(73) Assignee: Statistics & Control, Inc., West Des Moines, IA (US)

( * ) Notice: Subject to any disclaimer, the term of this patent is extended or adjusted under 35 U.S.C. 154(b) by 214 days.

(21) Appl. No.: 15/144,898

(22) Filed: May 3, 2016

Related U.S. Application Data (60) Provisional application No. 62/158,627, filed on May 8, 2015.

(51) Int. Cl.
*H02J 3/00* (2006.01)

(52) U.S. Cl.
CPC ...................... *H02J 3/00* (2013.01)

(58) Field of Classification Search
CPC ........................................................ H02J 3/00
See application file for complete search history.

(56) References Cited

U.S. PATENT DOCUMENTS

| | | | | |
|---|---|---|---|---|
| 5,422,561 A * | 6/1995 | Williams | ............ | H02J 3/1821 307/31 |
| 5,541,498 A * | 7/1996 | Beckwith | .................. | H02J 3/12 323/210 |
| 7,729,810 B2 * | 6/2010 | Bell | .................... | H02J 3/00 700/286 |
| 7,956,596 B2 | 6/2011 | Larsson | | |
| 8,692,537 B2 * | 4/2014 | Hyde | .................. | H02J 3/16 307/147 |
| 8,907,643 B2 | 12/2014 | Sreenivas et al. | | |
| 9,354,641 B2 * | 5/2016 | Peskin | .................. | G05B 13/04 |
| 9,377,803 B2 * | 6/2016 | Watanabe | ................ | G05F 1/70 |
| 2007/0229305 A1* | 10/2007 | Bonicatto | ................ | H04B 3/54 340/870.03 |
| 2010/0131117 A1* | 5/2010 | Mattiocco | .............. | G06Q 10/06 700/295 |
| 2012/0221265 A1* | 8/2012 | Arya | ..................... | G01R 29/18 702/61 |

(Continued)

OTHER PUBLICATIONS

Yu, Chien-Ning, "Real Power and Frequency Control of Large Electric Power Systems under Open Access", Massachusetts Institute of Technology, 137 pages. Jun. 26, 1996.

(Continued)

*Primary Examiner* — Daniel Kessie
(74) *Attorney, Agent, or Firm* — McKee, Voorhees & Sease, PLC (57) ABSTRACT

A system for controlling voltage for an electric power system comprising: at least two substations and at least one load using voltage control devices, with one voltage control module required for each substation with appropriate control elements for OLTC equipped transformers or turbo generator's automatic voltage regulators. Utilizing the system, methods of the like have the purpose of controlling the distribution of reactive power to minimize power losses, maintain each busbar voltage in accordance to selected set point, maintain active and reactive power reserves, and minimizing the reactive power drawn from the transmission system.

10 Claims, 9 Drawing Sheets

(56) References Cited

U.S. PATENT DOCUMENTS

| | | | | |
|---|---|---|---|---|
| 2012/0249278 A1* | 10/2012 | Krok | ............... | H02P 13/06 |
| | | | | 336/150 |
| 2014/0025218 A1* | 1/2014 | Nishi | ............... | H02J 3/06 |
| | | | | 700/295 |
| 2015/0005970 A1* | 1/2015 | Zweigle | ............ | H02J 3/24 |
| | | | | 700/295 |
| 2016/0224045 A1* | 8/2016 | Wong | ............... | G05F 1/66 |

OTHER PUBLICATIONS

Woodward Corp., "Speed Droop and Power Generation", Application Note 01302, 8 pages. Dec. 31, 1991.

Kaplan, Stan M., "Electric Power Transmission: Background and Policy Issues", Congressional Research Service, 42 pages. Apr. 14, 2009.

* cited by examiner

METHOD AND APPARATUS FOR VOLTAGE CONTROL IN ELECTRIC POWER SYSTEMS

CROSS-REFERENCE TO RELATED APPLICATIONS

This application claims priority under 35 U.S.C. § 119 to provisional application Ser. No. 62/158,627, filed May 8, 2015, herein incorporated by reference in its entirety.

FIELD OF THE INVENTION

The present invention relates generally to electric power systems. More particularly, but not exclusively, the invention relates to a method and apparatus of coordinated voltage control for electric power systems with at least two substations and at least one load, a method of controlling distribution of reactive power between substations within a power system of similar parameters, and a method of reduction of interaction between voltage control modules in the said power system.

BACKGROUND OF THE INVENTION

An electric power system also known as an electrical grid, or grid, is a network of interconnected components that typically involve a generation element (such as a nuclear power plant, a hydro-electric plant, or a smaller plant powered by gas fueled turbo generators), a transmission system (high voltage lines), a distribution system (lower voltage lines), and a set of customers or loads (lowest voltage levels). The connection between elements of the grid is accomplished through a set of step-up transformers (e.g., increasing voltage from a generating station to the transmission line) and step-down transformers (e.g., decreasing voltage from transmission lines into the distribution system via a substation equipped with such transformers). A healthy operation of the entire grid depends on healthy operation of each element of the grid. This is important from a cost perspective as well as safety perspective, which in turn makes optimal operation of the grid an important aspect even for policy makers, which is exemplified by Stan M. Kaplan's report to Congress, "Electric Power Transmission: Background and Policy Issues," CRS Report for Congress, 2009. The disclosure of each reference set forth herein is incorporated herein by reference in its entirety.

The health of the grid and its components is typically ensured by automatic generation control (AGC), which is a system for adjusting power output across multiple generators at different power plants and substations, especially in response to changes in consumption, or load. Since inception of electricity and power generation, this control was accomplished with fixing a single generating unit as a reference for regulation and having the remaining generating units be controlled using the so-called "speed droop". According to Woodward Corp, "Speed Droop and Power Generation," Woodward Application Note 01302, 1991, speed droop is a governor (or prime mover driving a synchronous generator) function which reduces the governor reference speed as fuel position (load) increases and vice versa. With modernization of power generation control, multiple generation units are enabled in regulation, which reduces wear and tear of each individual unit's control mechanisms and improves overall system operation and performance.

The disclosed invention is in the general field of automatic generation control, which is accomplished through two primary methods. The first method is the active power (P) and frequency (F) control, while the second method is reactive power (Q) and voltage (V) control. When connected to the grid, the frequency of a power plant network is fixed by the grid. The P/F control in this case is P control only. The purpose of P control is threefold. First, its purpose is to ensure optimal sharing of the load among the generators. Additionally, P control serves the purpose of maintaining the exchange of active power with grid in accordance to a defined set point. Finally, P control ensures adequate reserve capacity to maintain system stability in the event of an incident.

In cases where any sub-network operates in an island mode, the frequency of the sub-network is determined by the generators connected to the islanded part of the power plant network. In these cases the purpose of control has a distinct threefold purpose of controlling frequency at pre-defined set point by producing power set points (in MW) to all operating generators, ensuring optimal sharing of load among generators, and ensuring adequate reserve capacity to maintain system stability in the event of an incident.

Strictly speaking, active power and frequency control is not part of the presently claimed invention, however, it interacts with the claimed invention of reactive power and voltage control functionality and its overview is provided henceforth for completeness purposes only. Active (real) power and frequency control is known in the art with a good background provided by Chien-Ning Yu, "Real Power and Frequency Control of Large Electric Power Systems under Open Access," Master's Thesis, MIT, 1996.

It is imperative to have proper active power and frequency controls in place in order to achieve optimal operation and avoid system collapse. It is known that frequency within a power grid is constant when the same amount of electrical power is produced as consumed by the loads, including system losses. This is the optimal system state, however, if this is not the case frequency changes will occur. For example, the frequency of the system is reduced when a load increase is not compensated for by a corresponding increase of the turbine power of the connected generators. The power deficit will then decelerate the generator rotors and consequently reduce the frequency. Frequency reductions may also arise when production is lost, e.g., as a consequence of failures in the system where various safety response mechanisms disconnect the failed equipment from the grid. Significant reductions in frequency could lead to system collapse, due to the fact that most power station equipment, e.g. power supply systems, does not tolerate abnormally low frequencies. On the other hand, a load reduction in the system which is not compensated for by a reduction of turbine power leads to frequency increases, which could also destabilize the entire system.

The reactive mechanism similar to P/F control is Q/V control. Precise voltage control is required to ensure correct operating conditions for generators and loads. Voltage control is directly related to production and distribution of reactive power. Reactive power is the power used to support the transfer of real or active power over transmission and distribution networks in alternating current (AC) power systems, which are the majority of systems in modern power generation. In other words, reactive power is a large part of the cost associated with power generation and is a metric of a grid's efficiency to provide power to customers. The reactive power output of generator is controlled by means of machine excitation. Also, since transformers do not produce or consume any reactive power (they actually absorb reactive power), the Q/V control algorithm has to operate on both generators and transformers. As described in Larsson U.S. Pat. No. 7,956,596 B2, transformer voltage control is accomplished by changing transformer tap positions, which changes the flow of reactive power through the transformer. The purpose of Q/V control is threefold. First, Q/V control provides voltage control of selected busbars. Additionally, Q/V control ensures proportional sharing of reactive power among generators and transformers. Finally, Q/V control serves to limit the exchange of reactive power with the grid within a pre-defined range.

It is important that the voltage deviations in the system are limited. This is of importance for the connected loads, but a "good" voltage profile is also essential for keeping the losses low and for utilizing the reactive reserves to establish a secure operation of the system. Voltage control is, as been pointed out earlier, a more local control than the frequency control. Uniqueness and novelty of the disclosed invention is in the methodology used to accomplish coordinated voltage control, while controlling the distribution of reactive power between substations and reducing of interaction between voltage control modules.

SUMMARY OF THE INVENTION

In an embodiment, the present invention provides a system for controlling voltage for an electric power system. The system comprises at least two substations, wherein said substations further comprise at least one high level substation and at least one low level substation, and wherein said low level substation is connected to loads through step transformers; at least one load, wherein said load utilizes voltage control devices; at least one voltage control module required for each substation, wherein said voltage control module further comprises at least one high voltage control module and at least on low voltage control module, and wherein said voltage control module further comprises additional control elements; wherein said additional control elements are selected from the group consisting of on load tap controllers, turbo generators equipped with automatic voltage regulators, and combinations thereof; and at least one export/import control module. In a further aspect of the invention, the high level substations are connected to a power grid. In a still further aspect of the invention, the high level substations are not connected to a power grid.

In an embodiment, the present invention provides a method of coordinated voltage control for electric power systems that focuses on control of distribution of reactive power between substations while minimizing the interaction between voltage control modules. The method is applicable to power systems with at least two substations and at least one load. In an aspect of the invention, the method comprises: determining the operating mode of said voltage control module based on the actual power network configuration across said high level and low level substations; calculating a proportional-integral-derivative response of a high voltage control module from the deviation of said module's voltage variable to manipulate set points of the automatic voltage regulators of all generators directly connected to said high voltage substations; counteracting of potentially destabilizing interactions between high and low level control modules using a set point correction coefficient for low level proportional-integral-derivative voltage controller, wherein said set point correction coefficient is calculated by: computing a value for set point correction coefficient as a ratio of primary process control variable and primary voltage set point; and sending of said set point correction coefficient to each low level voltage control module; controlling of low level voltage substations by a voltage control function, wherein said voltage control function allows the low voltage control modules to manipulate the set points of the automatic voltage regulators of all generators directly connected to low voltage substations; maintaining of the predetermined relationship between all connected to substation generators accomplished by matching functions of reactive power load rate by the following steps: sensing reactive power flow rate of each generator connected to substation; calculating a value of a flow rate balancing parameter using a scaling factor, wherein said scaling factor is calculated as a ratio of power flow rate minimal limit subtracted from power flow rate current to power flow rate minimal limit subtracted from power flow rate maximal limit; calculating a value of a load sharing set point as the average of balancing parameters across all generators; and manipulating the performance of each generator to match said flow rate balancing parameter to said load sharing set point; executing a reactive power limiting control function which allows the system to calculate the "course" adjustments of OLTC to limit the exchange of reactive power with power grid within operator specified dead band, including the following steps: sensing reactive power flow rate of each transformer which connects the power network to grid; defining a reactive power flow set point within a predefined range; and defining a OLTC position for transformers when the reactive power flow rate exceeds a predefined set point; and calculating the response of said voltage control module from the deviation of its voltage variable to manipulate the set points of OLTC of the transformers.

In a further aspect of the invention, the set points for all generators connected to high level substations are determined by a submethod comprising: sensing a voltage for each said high level substation; defining a primary process control variable for a proportional-integral-derivative algorithm of said high voltage control module by constructing a function to calculate average high level bus voltage; using said proportional-integral-derivative algorithm of said high voltage control module to calculate said automatic voltage regulators main control output; defining a primary process control variable for each high level proportional-integral derivative algorithm of said export/import control module; defining a set point for each high level proportional-integral-derivative algorithm of said export/import control module; using said high level proportional-integral-derivative algorithm of said export/import control module to calculate the secondary control output of an automatic voltage regulator; and defining set points for turbo generators connected to high level substations by adding up primary and secondary control output.

In a still further aspect of the invention, set points definition for all generators connected to a low level substation or low level substations comprises the steps of: sensing a voltage for low level substation to be used as defining primary process control variable for a proportional-integral-derivative algorithm of low level voltage control module; defining a set point for a proportional-integral-derivative algorithm of said low level voltage control module, where its value is computed as operator defined set point multiplied by set point correction coefficient computed by a high level substation module; and using of said proportional-integral-derivative algorithm of said low level voltage control module to calculate the automatic voltage regulator main control output.

In an aspect of the invention, the transformers which connect a high level substation and a low level substation are connected in a way that minimizes interaction between high voltage buses.

In a further aspect of the invention, transformers which connect a high level load and a low level load are connected in a way that minimizes interaction between high voltage buses.

In an aspect of the invention, creating transformer OLTC set points comprises the steps of: sensing a voltage and reactive power flow rate for each transformer which connects a high level substation and a low level substation; defining a process control variable for each high level computation algorithm of a export/import control module; defining a set point for each said high level computation algorithm of said export/import control module; using said computation algorithm of said export/import control module to calculate a OLTC secondary control output; defining voltage control module set points for a transformer's OLTC by summing operator adjustable set point and secondary control output; defining a set point correction coefficient computed by a high level substation module to compute voltage control module set points; and defining an OLTC position for transformers when the voltage exceeds computed voltage control module set points.

In a still further aspect of the invention, the maintenance of proportional sharing of the load between two transformers operating in parallel, which is accomplished by matching functions of reactive power load rate by: sensing reactive power flow rate of each transformer; comparing reactive power flow rates; and generation of OLTC control step for only one transformer when the primary control variable exceeds computed Voltage Control Module Set Points by a load sharing algorithm, whereby said OLTC control step leads towards smaller difference between reactive power flow rates.

Therefore, it is a principal object, feature, and/or advantage of the present invention to overcome the deficiencies in the art. These and/or other objects, features, and advantages of the present invention will be apparent to those skilled in the art. The present invention is not to be limited to or by these objects, features and advantages. No single embodiment need provide each and every object, feature, or advantage.

DETAILED DESCRIPTION OF THE PREFERRED EMBODIMENT

The embodiments of this invention are not limited to particular methods of ear leaf defoliation, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural references unless the context clearly indicates otherwise. Further, all units, prefixes, and symbols may be denoted in their SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation; the preferred materials and methods are described herein. In describing and claiming the embodiments of the present invention, the headings provided are not limitations on the embodiments of the invention and the following terminology will be used in accordance with the definitions set out below.

Figure 1:
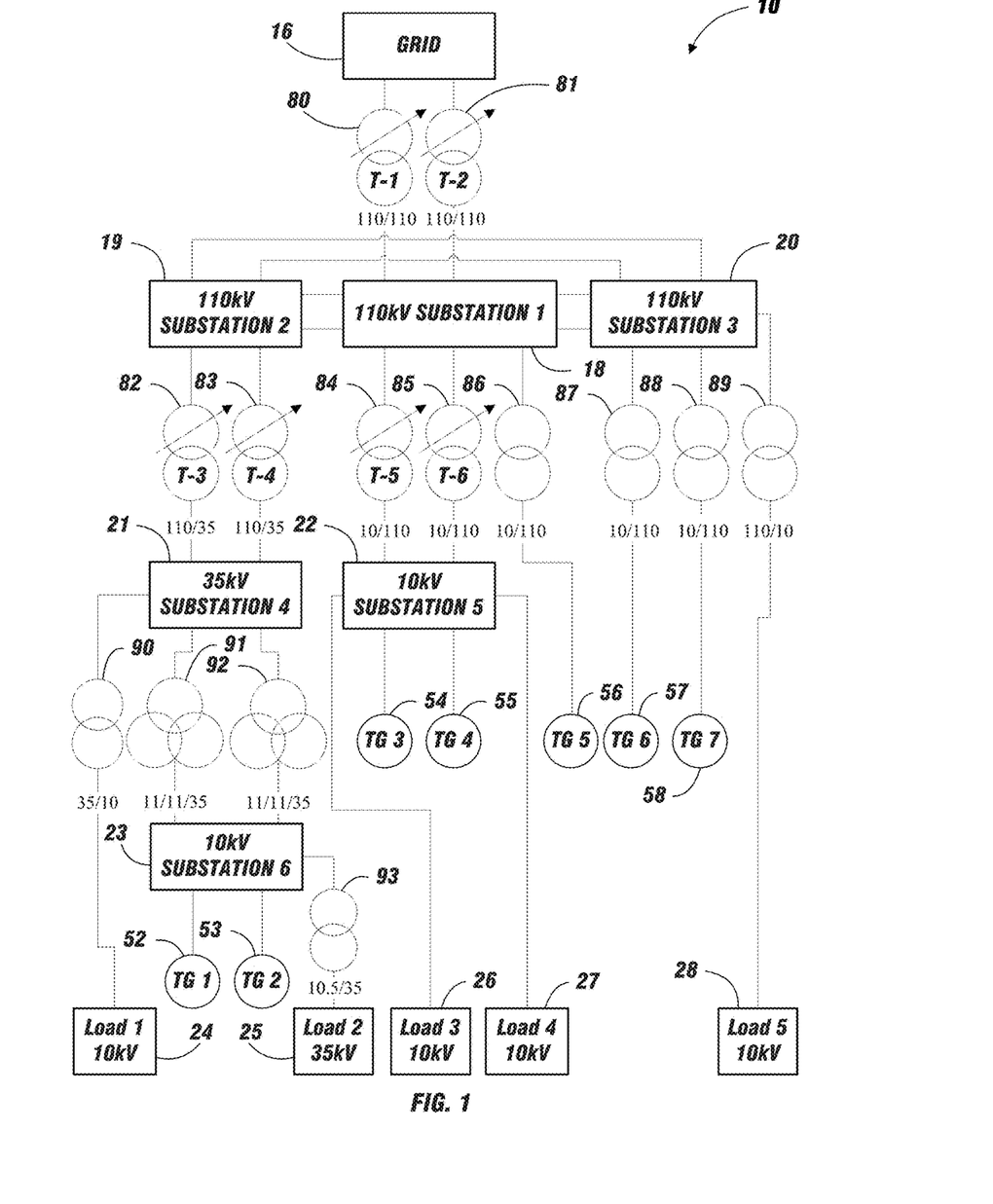
FIG. 1 shows a simplified example of a power distribution system.

Details of the disclosed invention are illustrated on a specific example of a simplified power distribution system 10 shown in FIG. 1, however, results and value of the invention is generalizable to any power distribution system with at least two substations and at least one load. The system 10 shown in FIG. 1 has five sources of electrical power:

1. Two transformers 80 and 81 (T-1 and T-2) connecting the 110 kV switchyard to the grid 16.
2. Two turbo generators 52 and 53 (TG1 and TG2) in substation 6, referenced as 23 connected at 11 kV.
3. Two turbo generators 54 and 55 (TG3 and TG4) in substation 5, referenced as 22 connected at 10 kV.
4. One turbo generator 56 (TG5) in substation 1, referenced as 18 connected at 110 kV.
5. Two turbo generators 57 and 58 (TG6 and TG7) in substation 3, referenced as 20 connected at 110 kV.

The main system transformers 80-85 (T-1 through T-6) are used in voltage control operations and are equipped with OLTCs. Each transformer's index indicates the to/from voltage transformation. For example, transformer 82 (T-3) index is 110/35, which means that T-3 transforms 110 kV of potential available in Substation 2, referenced as 19 into 35 kV of potential in Substation 4, referenced as 21. Also, transformer 84 (T-5) index is 10/110. Since Substation 5, referenced as 22 is powered by turbo generators 54 and 55 (TG3 and TG4), which usually operate at 10 kV, transformer 84 (T-5) steps-up 10 kV from Substation 5, referenced as 22 into 110 kV in Substation 1, referenced as 18. The diagonal arrow through the double circle transformer index indicates presence of an OLTC, see transformers 80-85, while three circle symbol indicates a three winding potential transformer, see transformers 91 and 92.

All gas turbine driven generators are equipped with voltage regulatory control systems. The network supplies five main loads 24-28 (LOAD 1 through LOAD 5) of varying voltage. For example, load 25 (LOAD 2) is connected to Substation 6, referenced as 23 with a step-up transformer 93 taking 10.5 kV into 35 kV.

The disclosed invention is embedded into the overall power control system (PCS) which controls generators and transformers in the various subsystems in order to achieve voltage control, reactive power control, active power control, and frequency control of the system. PCS produces set points for all generators and also controls the set points of the transformers' OLTCs.

Active Power and Frequency Control

Figure 2:
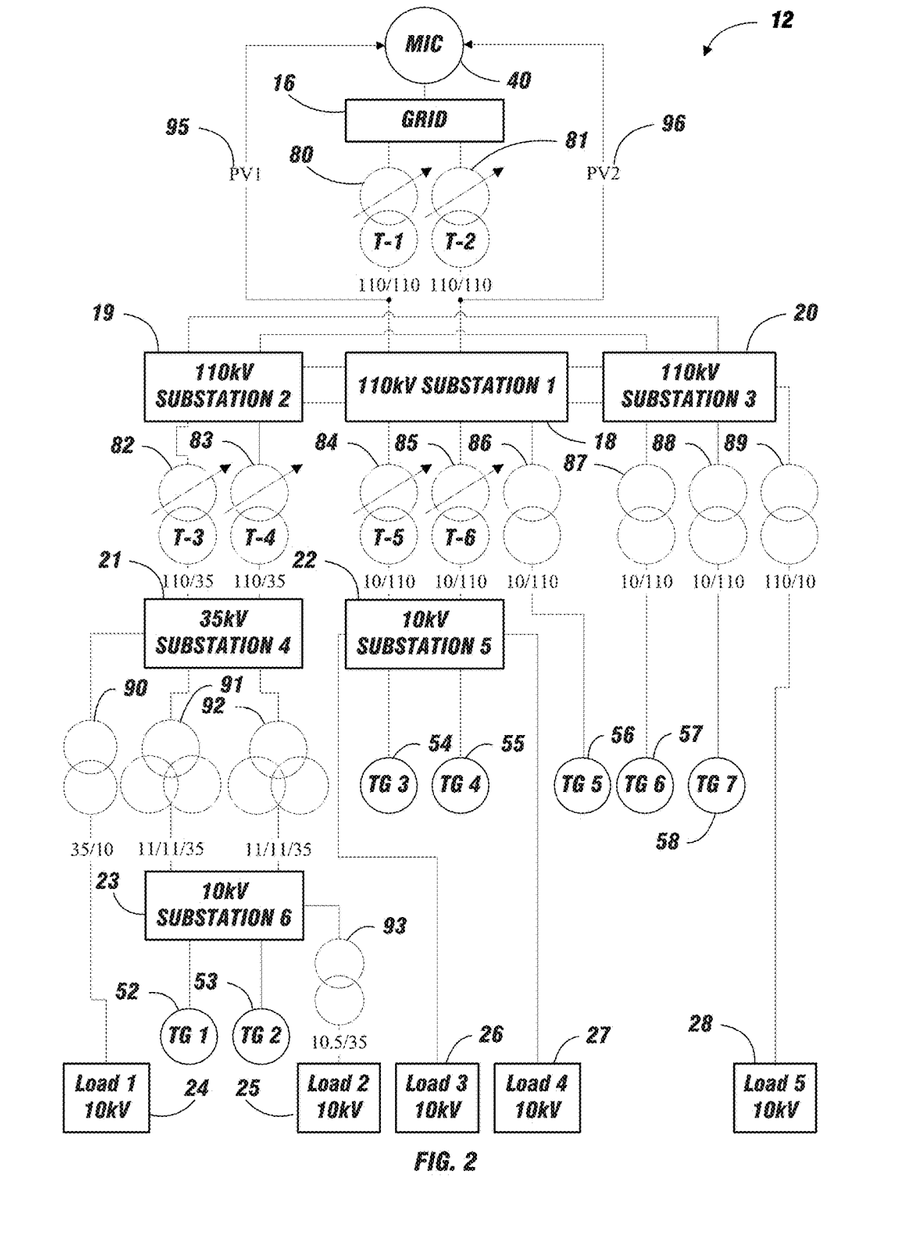
FIG. 2 shows a active power and frequency control architecture.

One of the primary control functions of PCS is active power and frequency control. This is well known in the art and is provided in this document for reference and completeness purposes only due to the fact that P/F control interacts with the disclosed voltage control algorithms. FIG. 2 shows the high level active power and frequency control module architecture deployed within the power system provided in FIG. 1. FIG. 2 shows that the active power and frequency control algorithm, as performed by a master indicating controller or MIC 40, utilizes two PID control loops. MIC's first PID control loop 95 is the active power flow from and to the grid 16, indicated by PV1, and the second PID control loop 96 is the power load sharing control loop, indicated by PV2.

The primary control variable PV1 in MIC 40 loop is the active power flow to/from grid. Its set point is denoted by 97 and it is operator adjustable. MIC 40 final control elements are the gas turbines' 52-58 (TG1-TG7) fuel controllers, which accept power (MW) set points from MIC 40. The secondary power load sharing control loop's purpose is to distribute the total load by equalizing appropriate variables. The primary control variables of load sharing control applications are megawatt (MW) load of each turbo generator. The set points for the load sharing control application is the average megawatt (MW) load of all generators operating in droop control mode.

The fundamental idea of droop control is that since all synchronous generators frequencies are set by the grid, each generator must run at the same speed. Let $f_{TGi}$, $p_{TGi}$, and $N_{TGi}$ be the frequency (in Hz), number of poles, and speed (in RPM) respectively of generator TGi, for i=1, . . . , 7. Then the following relationship holds, as shown in Equation 1:

$$f_{TGi} = \alpha \cdot p_{TGi} \cdot N_{TGi} \quad \text{(Eq. 1)}$$

where $\alpha$ is a constant. Therefore, frequency is directly proportional to speed. Next, depending on the rating (aka no load speed) of each generator's turbine $R_{TGi}$ and its full load speed $F_{TGi}$, the droop percent is calculated according to Equation Eq. 2:

$$Droop\% = \frac{R_{TGi} - F_{TGi}}{R_{TGi}} \quad \text{(Eq. 2)}$$

Thus, droop can be thought of as a percentage change in rating (or design) speed required for 100% governor action. Since the frequency is fixed by the grid, so is each generator's speed, thus an increase in turbine speed reference increases $R_{TGi}$ $F_{TGi}$, which then drives the controller to increase fuel flow to increase power output. Thus, final control elements for load sharing control are the same as with active power flow control, which are gas turbines 52-58 (TG1-TG7) fuel controllers. The end result is that each turbo generator shares load which is proportional to its rating.

Let $CVP_{TGi}$ denote the fuel controller action issued by MIC 40 PV1 loop 95 (active power) and let $CVL_{TGi}$ denote the fuel controller action issued by MIC 40 PV2 loop 97 (load sharing). The final output from MIC 40 is then given by Equation 3:

$$MIC = \Sigma_{i=1}^{7}(CVP_{TGi} + CVL_{TGi}) \quad \text{(Eq. 3)}$$

In situations when the local power distribution network is isolated from the grid, frequency controls are enabled. The MIC 40 control application uses an alternative control variable measuring network frequency. The frequency set points are operator adjustable and final control elements are still the gas turbines 52-58 (TG1-TG7) fuel controllers. Further detail on the relationship between active power control modules is provided in FIG. 3.

Figure 3:
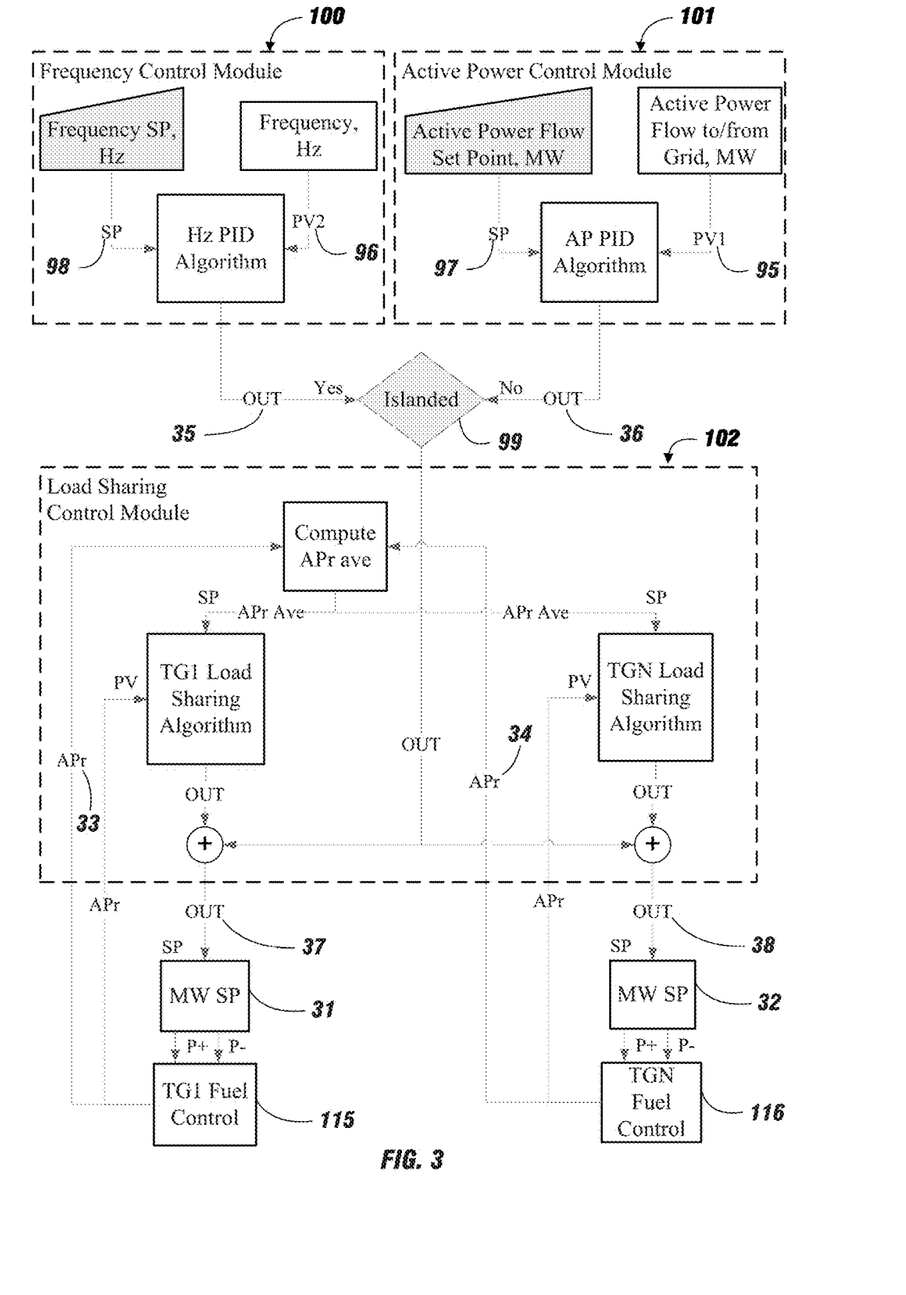
FIG. 3 shows relationships between active power control modules.

Configuration decision within the MIC 40 control application is active power versus frequency control, which depends on whether the network is connected to the grid (active power control) or is islanded (frequency control). If grid is connected, the active power flow between grid and power network is controlled by active power control module 101. The main objective of control then is to maintain active power flow by producing megawatt set points (MW SP) 31 and 32 to turbo generators 115-116 (TG1-TGN) power controllers. The system uses a PID computation algorithm to calculate each MW SP, where PID control itself is well known in the art, see for example, U.S. Pat. No. 8,907,643 B2 by Sreenivas et al. The active power control module 101 interacts closely with the load sharing control module 102 which keeps all operating generators within predefined range in accordance with the generator manufacturer and dispatcher recommendations.

If the network is islanded (i.e., if the grid is not connected), then the measured frequency is maintained by frequency control module 100. Similar to active power control, a PID algorithm is used by the frequency control module 100 to produce MW SP's 31 and 32 for all turbo generators 115-116 (TG1-TGN), where N=7 for the power system shown in FIG. 1, wherein turbo generators TG1-TG7 are referenced as 52-58.

Regardless of connection to the grid, both active power module 101 and frequency control module 100 interact with the load sharing module 102. The module input is either frequency control module 100 output 35 or active power control module 101 output 36, and measured active power 33 and 34 from turbo generators 115 and 116. The modules process measured active power received from turbo generators TG1-TGN to calculate the average load sharing set point according to Equation 4:

$$APr_{ave} = \frac{\sum_{i=1}^{N} Apr_{TGi}}{N} \quad \text{(Eq. 4)}$$

Next, the load sharing module 102 analyzes the operating conditions of each unit and calculates the adjustments (if any) to be made to the main stream control outputs 37 and 38. It then sends the output adjustments to the MW SP 31 and MW 32 for implementation.

The described design has the effect of maintaining headroom between actual and maximum turbine output for frequency response reserve as a result of its load sharing action. The load sharing function is designed to put all turbine-generators at the same per unit load with respect to their present-day maximum capacities. In addition, the MW control limits of each unit are settable by the control-room operator. This allows the operator to ensure the availability of frequency responsive reserve on each unit by setting the high control limit of the load sharing module 102 at a suitable value below what the operator knows to be the maximum capability in a given day.

Reactive Power and Voltage Control

Figure 4:
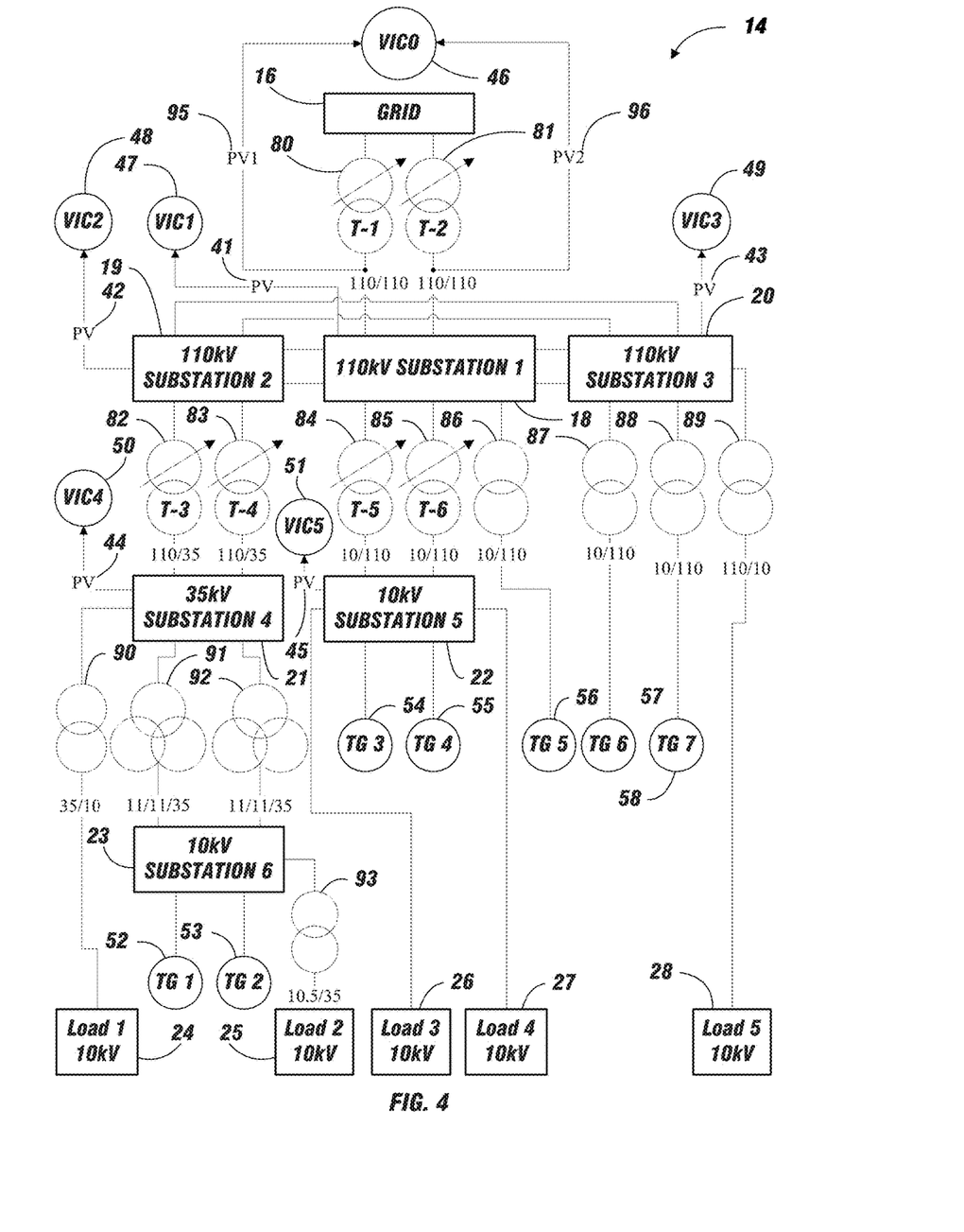
FIG. 4 shows a reactive power and voltage control architecture.

FIG. 4 shows the reactive power and voltage control architecture specific to the power system displayed in FIG. 1. There are six voltage indicating controller (VIC) control loops 47-51 involved in efficient operation of the said power system. First is the VIC0 46 reactive power master control loop. The primary control variable of the VIC0 46 controller is reactive power flow to and from the grid 16, PV1 and PV2, 95 and 96 respectively. Let $\delta_{VIC0}$ be a predefined target variance for the VIC0 46 set point, which is operator adjustable, call the set point SP0. Then SP0 is allowed to vary in the following interval [SP0−$\delta_{VIC0}$, SP0+$\delta_{VIC0}$]. VIC0 46 final control elements are the on load tap changers (OLTC) of T-1 and T-2 transformers, 80 and 81 respectively.

The second control loop 47 is VIC1 which controls the reactive power and voltage for the 110 kV Substation 1, referenced as 18. The primary control variable of the VIC1 controller 47 is the 110 kV Substation 1, referenced as 18, bus voltage, 41. Let $\delta_{VIC1}$ be a predefined target variance for the VIC1 set point 41, which is operator adjustable or adjustable by a coordinated master controller, call the set point SP1. Then SP1 is allowed to vary in the following interval [SP1−$\delta_{VIC1}$,SP1+$\delta_{VIC1}$]. VIC1 final control elements are the AVRs of TG5 as well as the OLTC's of T-5 and T-6 transformers.

The third control loop 48 is VIC2 which controls the reactive power and voltage for the 110 kV Substation 2, referenced as 19. The primary control variable of the VIC2 controller 48 is the 110 kV Substation 2, referenced as 19, bus voltage, 42. Let $\delta_{VIC2}$ be a predefined target variance for the VIC2 set point 42, which is operator adjustable or adjustable by the coordinated master controller, call the set point SP2. Then SP2 is allowed to vary in the following interval [SP2−$\delta_{VIC2}$,SP2+$\delta_{VIC2}$]. VIC2 final control elements are the OLTC's of T-3 and T-4 transformers.

The fourth control loop 49 is VIC3 which controls the reactive power and voltage for the 110 kV Substation 3, referenced as 20. The primary control variable of the VIC3 controller 49 is the 110 kV Substation 3, referenced as 20, bus voltage, 43. Let $\delta_{VIC3}$ be a predefined target variance for the VIC3 set point 43, which is operator adjustable or adjustable by the coordinated master controller, call the set point SP3. Then SP3 is allowed to vary in the following interval [SP3−$\delta_{VIC3}$,SP3+$\delta_{VIC3}$]. VIC3 final control element is the AVR of TG-6 and the AVR of TG-7.

The fifth control loop 50 is VIC4 which controls the reactive power and voltage for the 35 kV Substation 4, referenced as 21. The primary control variable of the VIC4 controller is the 35 kV Substation 4, referenced as 21, bus voltage, 44. Let $\delta_{VIC4}$ be a predefined target variance for the VIC4 set point 44, which is operator adjustable or adjustable by the coordinated master controller, call the set point SP4. Then SP4 is allowed to vary in the following interval [SP4−$\delta_{VIC4}$,SP4+$\delta_{VIC4}$]. VIC4 final control element is the AVR of TG-1 and the AVR of TG-2.

The sixth control loop 51 is VIC5 which controls the reactive power and voltage for the 10 kV Substation 5, referenced as 22. The primary control variable of the VIC5 controller is the 10 kV Substation 5, referenced as 22, bus voltage, 45. Let $\delta_{VIC5}$ be a predefined target variance for the VIC5 set point 45, which is operator adjustable or adjustable by the coordinated master controller, call the set point SP5. Then SP5 is allowed to vary in the following interval [SP5−$\delta_{VIC5}$,SP5+$\delta_{VIC5}$]. VIC5 final control element is the AVR of TG-3 and the AVR of TG-4.

The seventh and last control loop 46 is the VIC0 load sharing control loop which distributes the total reactive load by equalizing appropriate variables. The primary control variables of the reactive power load sharing control application are the reactive power measures (MVAR) of each generator. Let $Qr_{TGi}$ denote the rated reactive power of each turbo generator operating in droop control mode in a given power system. Then the reactive power load sharing control application set point is given by Equation 5:

$$Qr_{ave} = \frac{\sum_{i=1}^{7} Qr_{TGi}}{7} \tag{Eq. 5}$$

VIC0 46 load sharing application final control elements are similar to those of VIC1-VIC5, referenced as 47-51 which are turbo generator AVR's and transformer OLTC's across the entire power system. Let $CVQ_j$ denote the fuel controller action issued by the reactive power load sharing control application and let $CVV_j$ denote the master controller loop/voltage control loops controller actions, where j spans the variety of AVR and OLTC actions. The final output from the VIC controller is then given by Equation 6:

$$VIC = CVQ_j + CVV_j \tag{Eq. 6}$$

Figure 5:
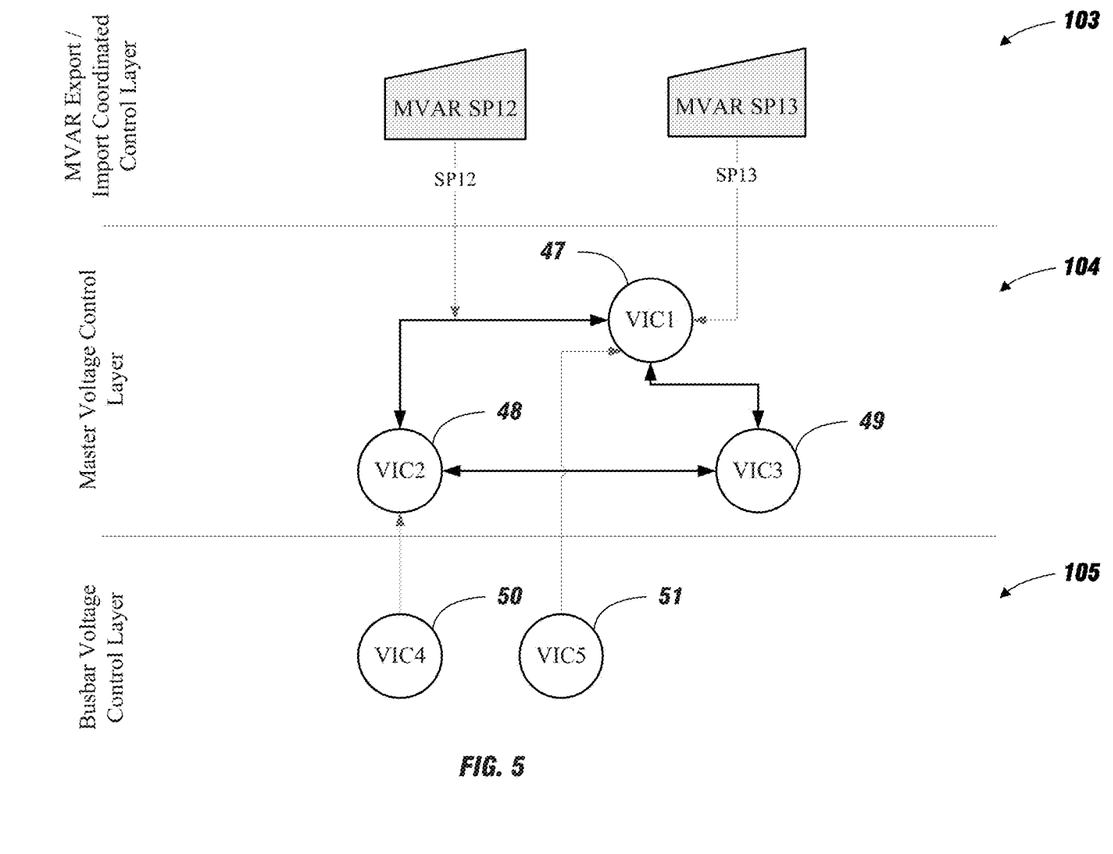
FIG. 5 shows a voltage control architecture for the simplified power distribution system example provided in FIG. 1.

The overall voltage control architecture can be thought of consisting of three distinct layers of control.
1. MVAR export/import coordinated control layer 103;
2. Master voltage control layer 104;
3. Bus voltage control layer 105.

FIG. 5 shows the architecture specific to the power system illustrated by FIG. 1. Starting at the top of the control strategy is the total facility MVAR exchange control, which is responsible for the export/import of reactive power between all of the substations, in particular, between Substation 1 and Substation 2 (indicated by MVAR SP12) and between Substation 1 and Substation 3 (indicated by MVAR SP13). The middle layer is the coordinated voltage control across high level Voltage Controllers 1, 2, and 3 orchestrated by the master voltage controller. The final tier is the busbar voltage control (low level voltage control) which consists of Voltage Controllers 4 and 5.

Figure 6:
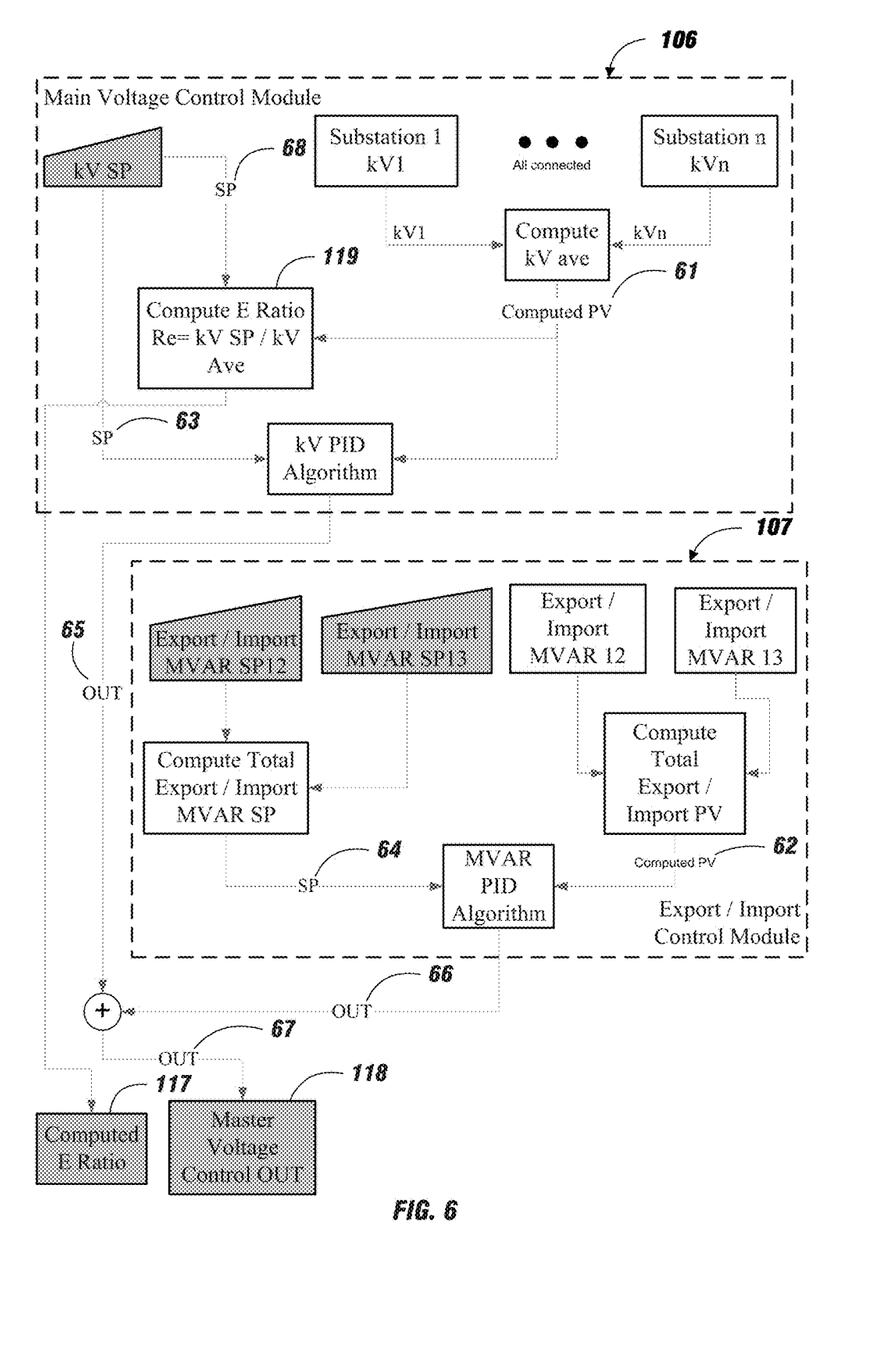
FIG. 6 shows a high voltage control strategy.

The disclosed invention utilizes different strategies to regulate voltage for high voltage and low voltage substations. The strategy of high level substation voltage control is shown in FIG. 6. There are two main components within high level substation voltage control. First component is the main voltage control module 106. The key objective of the main voltage control module 106 is to maintain average voltage of all high level substations by producing set points to the corresponding turbo generators' AVRs followed by utilization of the PID control algorithm. Second component is the reactive power controller exemplified by the MVAR export/import control module. The primary purpose of the export/import control module is to distribute the total load by equalizing appropriate variables. The primary control variable of export/import control module is average MVAR of all export/import distribution lines. Export/import control module set point is average operator adjustable set points of all export/import distribution lines. The master voltage control output is the sum of the main voltage control module and export/import control module outputs. Finally, high voltage substation control is achieved by summarizing output from main voltage control module and the export/import control module.

Referring now to the power system shown in FIG. 1 and referencing FIG. 6, there are three high voltage substations—Substation 1, Substation 2, and Substation 3, referenced as 18-20, all with 110 kV. The control algorithm proceeds with the following steps. First, let $kV_i$ be each substation's bus voltage control, for i=1, 2, 3. Second, the main voltage control module's 106 kV PID algorithm calculates the process variable 61 according to Equation 7:

$$PV_{kV} = \frac{\sum_{i=1}^{3} kV_i}{3} \quad (\text{Eq. 7})$$

Third, the kV PID algorithm uses kV set point 63 in conjunction with the computed $PV_{kV}$ to generate the module output 65.

The next series of steps is the invocation of the MVAR export/import control module 107, which distributes the total load by equalizing appropriate variables. In particular, the fourth step involves calculation of the total export/import process variable 62. Let $MVAR_{12}$ be the export/import MVAR value between Substation 1 and Substation 2. Let $MVAR_{13}$ be the export/import MVAR value between Substation 1 and Substation 3. Then let $PV_{MVAR}$ be the primary control variable of the export/import control module, which is calculated as the average MVAR of all export/import distribution lines. In case of the power system displayed in FIG. 1, the PV calculation can be expressed by Equation 8:

$$PV_{MVAR} = \frac{MVAR_{12} + MVAR_{13}}{2} \quad (\text{Eq. 8})$$

Each export/import distribution line has an operator adjustable set point. Let $MVAR\_SP_{12}$ be the operator adjustable set point value of reactive power export/import between Substation 1 and Substation 2. Let $MVAR\_SP_{13}$ be the operator adjustable set point value of reactive power export/import between Substation 1 and Substation 3. The fifth step is then for the export/import control module to calculate the overall export/import set point 64 according to Equation 9:

$$PV\_SP_{MVAR} = \frac{MVAR\_SP_{12} + MVAR\_SP_{13}}{2} \quad (\text{Eq. 9})$$

The sixth step of the algorithm summarizes the output generated by step three (voltage control output 65) and step five (export/import control module output 66). Total output is the master voltage control output 67.

The seventh and final step of the algorithm is to counteract potentially destabilizing interactions between high and low level control modules by calculating a set point correction coefficient for the low level PID voltage controller. The kV set point 68 is combined with the computed PV 61 according to Equation 10 within 119:

$$R_e = \frac{kV\_SP}{PV_{kV}} \quad (\text{Eq. 10})$$

The correction coefficient is called the E ratio and is calculated as a ratio of the primary process control variable to primary voltage set point. Finally, the algorithm sends the said set point correction coefficient to each low level voltage control modules as described herein.

Figure 7:
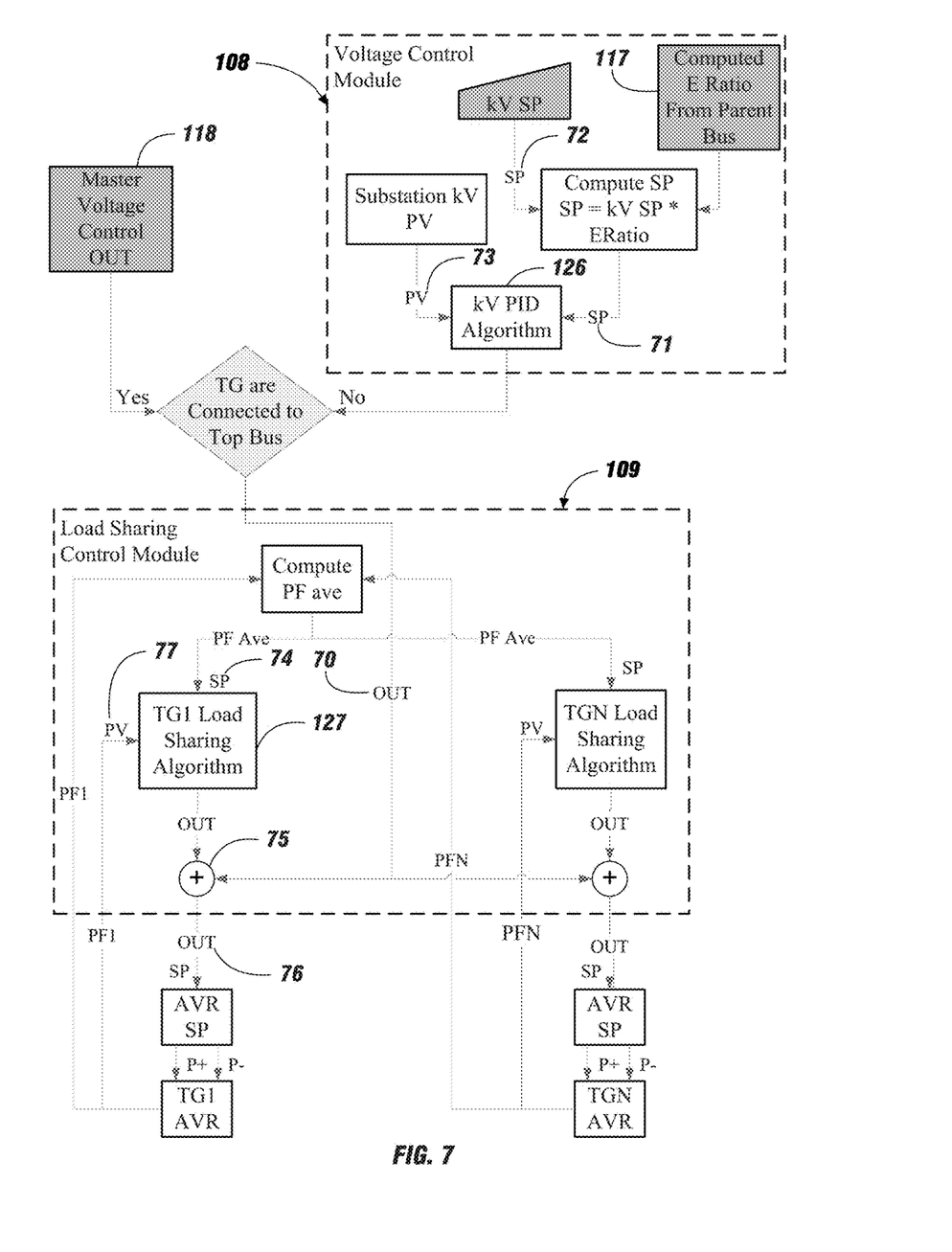
FIG. 7 shows a substation bus (low level) voltage control.

Low level substation voltage control uses the high level substation voltage control as input and its overall strategy is shown in FIG. 7. There are three main components within low level substation voltage control, which are the high level control output (which is either master voltage control output, in case when low level substation turbo generators are connected to the top bus or the computed E Ratio, in case when the turbo generators are not connected to the top bus), substation voltage control module 108, and the load sharing control module 109.

The main objective of voltage control module 108 is to maintain voltage by producing set point 70 to the turbo generators' AVRs. The voltage control module algorithm has three inputs: substation measured voltage 73, operator adjustable set point 72, and the E Ratio, $R_e$, calculated by the high level control module. The control module uses a PID algorithm to calculate turbo generator's AVR set points 70. The set point 71 being fed into the PID algorithm 126 is calculated by Equation 11:

$$SP = kV\ SP \cdot R_e \quad (\text{Eq. 11})$$

The PID algorithm 126 is then executed using PV 73 and SP 71. Referring now to the power system shown in FIG. 1, consider the following two low voltage substations: 35 kV Substation 4, referenced as 21 and 10 kV Substation 5, referenced as 22. Substation 4, referenced as 21 voltage is maintained by AVRs of TG1 and TG2, referenced as 52 and 53, whereas Substation 5, referenced as 22 voltage is maintained by AVRs of TG3 and TG4, referenced as 54 and 55. In situations, where turbo generators are connected to the master voltage control layer 104 the low level substation control output is obtained as master voltage control OUT 118. In the example provided by FIG. 1, there are two such substations: 110 kV Substation 1, referenced as 18 and 110 kV Substation 3, referenced as 20. In this case, Substation 1, referenced as 18 voltage is maintained by the AVR of TG5, referenced as 56 and Substation 3, referenced as 20 voltage is maintained by the AVR's of TG6 and TG7, referenced as 57 and 58. Let the final voltage control output 70 be M_OUT.

In such multi-unit generator settings, the disclosed invention provides a load sharing function which allows balancing of the reactive power output among all the generators. Let $PV_{lsi}$ denote the load rate (or load sharing process variable 77) of each generator with i=1, ..., N. Then the load rate is computed according to Equation 12:

$$PV_{lsi} = \frac{MVAR_i - MVAR_{imin}}{MVAR_{imax} - MVAR_{imin}} \quad (\text{Eq. 12})$$

Each turbo generator's load sharing algorithm step 127 then compares $PV_{lsi}$ with the average load rate (or load sharing set point 74), where SP 74 is given by Equation 13:

$$SP_{ave} = \frac{\sum_{i=1}^{N} PV_{lsi}}{N} \quad (\text{Eq. 13})$$

If each unit load sharing process variable 77 is different from load sharing set point 74, a correction is carried out on each generator according to Equation 14:

$$OUT_{lsi} = \begin{cases} OUT_{lsi(n-1)} - \Delta_i \mid PV_{lsi} > SP_{ave} \\ OUT_{lsi(n-1)} + \Delta_i \mid PV_{lsi} < SP_{ave} \end{cases} \quad \text{(Eq. 14)}$$

Where $OUT_{lsi}$ is the load sharing loop current scan output 75, $OUT_{lsi(n-1)}$ is the load sharing loop previous scan output and $\Delta_i$ is a parametrically defined load sharing ramp. Finally, the main TG set point 76 for each turbo generator is provided by Equation 15:

$$OUT_i = OUT_{lsi} + M\_OUT \quad \text{(Eq. 15)}$$

Thus each turbo generator control is the additive action of the main voltage control and load sharing control.

Figure 8:
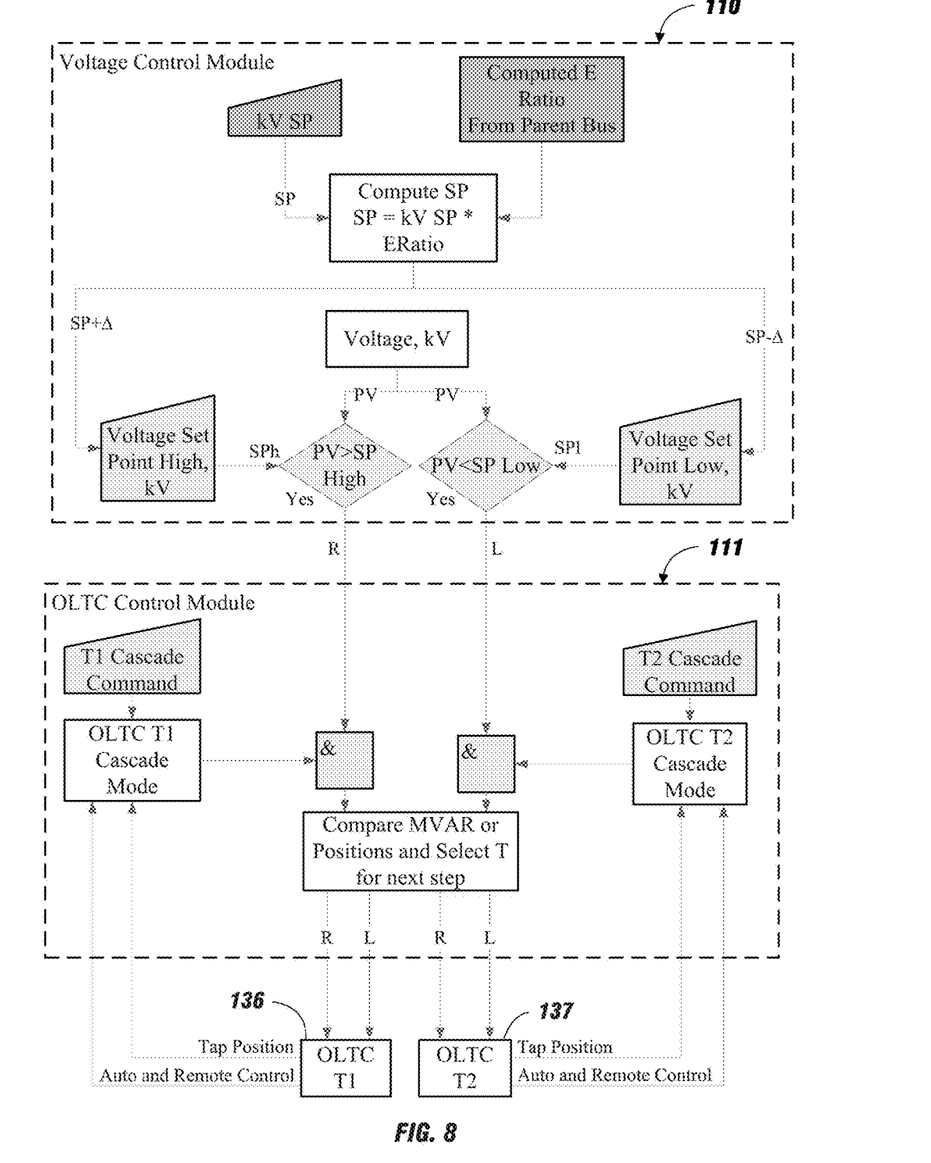
FIG. 8 shows control action of two transformers based on the bus voltage metering.

Next section of the disclosed invention relates to transformer control actions for the low level substations. FIG. 8 illustrates the control action of two transformers based on bus voltage metering. The algorithm consists of two major components: the voltage control module 110 and OLTC control module 111. The voltage control module 110 utilizes transformer OLTC's as a method of "coarse" voltage adjustment. The algorithm proceeds with creating a set point SP which is calculated according to Equation 16:

$$SP = kV\ SP \cdot R_e \quad \text{(Eq. 16)}$$

Where kV SP is operator adjustable and $R_e$ is the E Ratio calculated by the high level substation module. This set point is split into high voltage set point SPh and low voltage set point SPl using a dispatcher adjustable parameter $\delta$ according to Equations 17 and 18:

$$SPh = SP + \delta \quad \text{(Eq. 17)}$$

$$SPh = SP - \delta \quad \text{(Eq. 18)}$$

This is done to ensure that the on load tap changers only change position whenever the demand value exceeds a set of predefined limits. The voltage control module 110 provides the "Raise" R or "Lower" L commands to the OLTC control module based on conditions provided by Equation 19:

$$OUT = \begin{cases} R \mid PV > SPh \\ L \mid PV < SPl \end{cases} \quad \text{(Eq. 19)}$$

The transformers' OLTCs can operate independently from each other or their steps can be coordinated. For example, if OLTC T2 137 cascade mode is OFF and OLTC T1 136 cascade mode is ON, then only T1 will execute the voltage control module 110 "Raise" and "Lower" commands. In case of coordination, the disclosed invention provides a load sharing function which allows balancing of the reactive power output among such transformers.

Each transformer's reactive power range (Qmin and Qmax) is defined based on rated power and flowing active power according to Equations 20 and 21:

$$Qi\_min = -\sqrt{MVA_i^2 - MW_i^2} \quad \text{(Eq. 20)}$$

$$Qi\_max = \sqrt{MVA_i^2 - MW_i^2} \quad \text{(Eq. 21)}$$

For i={1,2}. Similar to above, the load rate is computed according to Equation 22:

$$PV_{lsiBT} = \frac{MVAR_i - MVAR_{imin}}{MVAR_{imax} - MVAR_{imin}} \quad \text{(Eq. 22)}$$

Each OLTC's load sharing algorithm step then compares $PV_{lsiBT}$ with the average load rate (or load sharing set point) given by Equation 23:

$$SP_{lsR0} = \frac{\sum_{i=1}^{2} PV_{lsiBT}}{2} \quad \text{(Eq. 23)}$$

If each unit load sharing process variable is different from the load sharing set point, a correction is carried out on each transformer according to Equation 24):

$$OUT_{Tlsi} = \begin{cases} OUT_{Tlsi(n-1)} - \epsilon_i \mid PV_{lsiBT} > SP_{lsR0} \\ OUT_{Tlsi(n-1)} + \epsilon_i \mid PV_{lsiBT} < SP_{lsR0} \end{cases} \quad \text{(Eq. 24)}$$

Where $OUT_{Tlsi}$ is the transformer's load sharing loop current scan output, $OUT_{Tlsi(n-1)}$ is the load sharing loop previous scan output and $\epsilon_i$ is a parametrically defined load sharing ramp.

Figure 9:
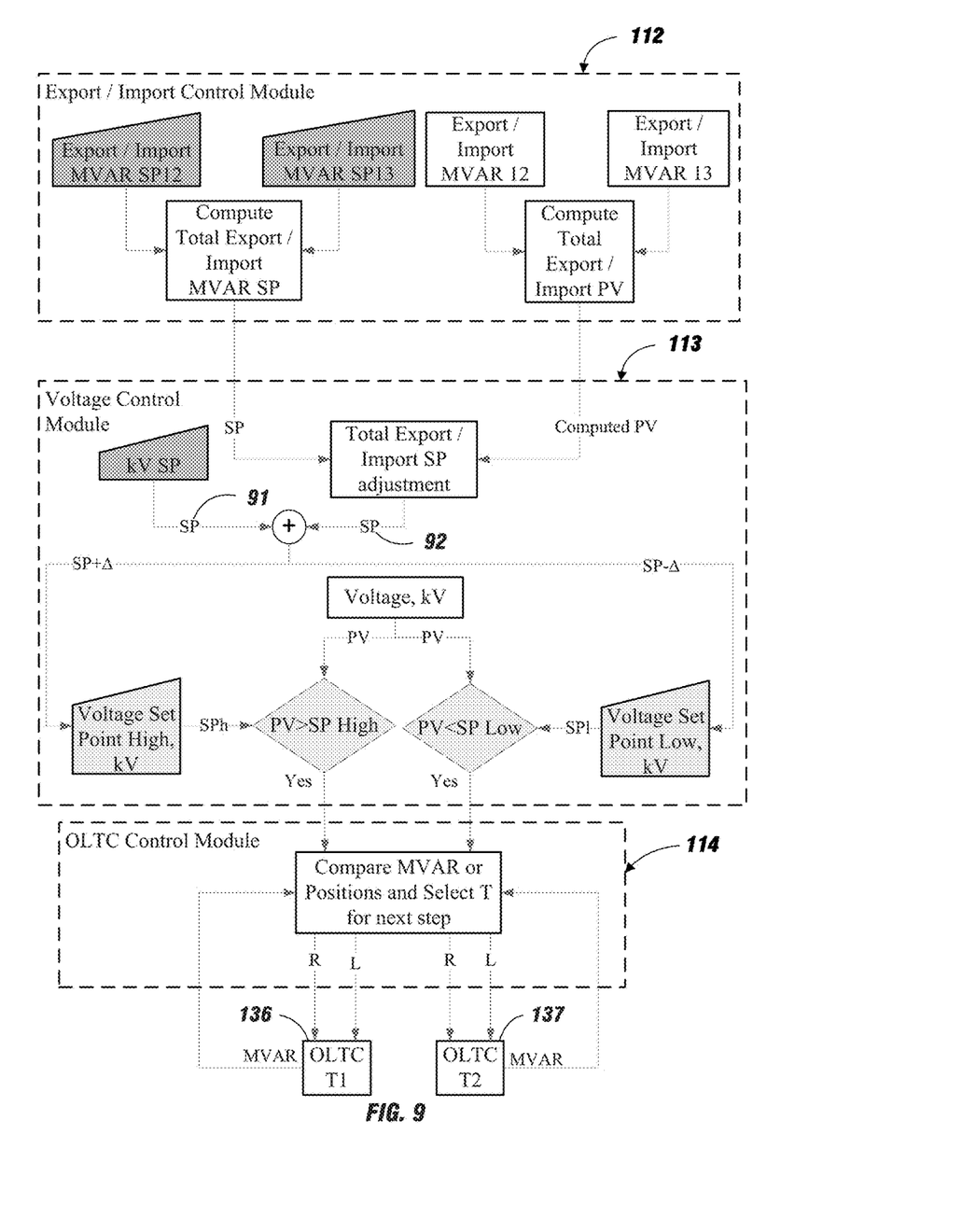
FIG. 9 shows a high level voltage control module control action.

The final step of the disclosed invention is the high level voltage control module control action; its architecture is shown in FIG. 9. The main algorithm idea is similar to that of low level voltage control; it is a combination of voltage control module and OLTC control module. The key difference with high level voltage control is the export/import control module that regulates reactive power. The high level voltage control module control action is implemented by manipulating OLTCs of two transformers based on the bus voltage metering, where the on load tap changers of the transformers are used as a "coarse" voltage adjustment.

The high level voltage control module action consists of three major components. These are the export/import control module 112, which distributes the total load by equalizing appropriate variables, the voltage control module 113 which provides the high and low level set points, and the OLTC control module 114 which adjusts tap changer positions to generate appropriate MVAR values.

The primary control variable of export/import control module 112 is the average MVAR of all export/import distribution lines. Referring now to the power system shown in FIG. 1, the two major MVAR set points are operator adjustable and are set by the export/import of reactive power between Substation 1 and Substation 2 as well as between Substation 1 and Substation 3. Let the former export/import MVAR set point be denoted by SP12 and let the latter export/import MVAR set point be denoted by SP13. The overall export/import control module set point is then given by Equation 25:

$$MVARSP = \frac{MVARSP12 + MVARSP13}{2} \quad \text{(Eq. 25)}$$

Additionally, let MVAR 12 and MVAR 13 be the measured process variables for the exchange of reactive power between Substation 1 and Substation 2 and Substation 1 and Substation 3, respectively. Then the total export/import PV is given by Equation 26:

$$MVARPV = \frac{MVARPV12 + MVARPV13}{2} \quad \text{(Eq. 26)}$$

Next step of the algorithm is the voltage control Module 113. The set point for control algorithm of high level voltage control module is the sum of the operator defined set point 91 and the export/import control module outputs 92; let this set point value be $\sigma\_SP$. This set point is split into high voltage set point H_SPh and low voltage set point H_SPl using a dispatcher adjustable parameter $\gamma$ according to Equations 27 and 28:

$$H\_SPh = \sigma\_SP + \gamma \quad \text{(Eq. 27)}$$

$$H\_SPl = \sigma\_SP - \gamma \quad \text{(Eq. 28)}$$

As before, this is made available by the disclosed invention to ensure that the load tap changers only change position whenever the demand value exceeds a set of predefined limits. Similar to low level substation control, the voltage control module 113 provides the "Raise" R or "Lower" L commands to the OLTC control module 114 based on conditions provided by Equation 29:

$$OUT = \begin{cases} R \mid PV > SPh \\ L \mid PV < SPl \end{cases} \quad \text{(Eq. 29)}$$

Transformers' OLTCs can operate independently from each other or their steps can be coordinated. For example, if OLTC T2 137 cascade mode is OFF and OLTC T1 136 cascade mode is ON, then only T1 will execute voltage control module's "Raise" and "Lower" commands. In case of coordination, as with the low voltage control, the disclosed invention provides a load sharing function which allows balancing of the reactive power output among such transformers.

Similar to low level voltage control, each high voltage transformer's reactive power range (HL_Qmin and HL_Qmax) is defined based on rated power and flowing active power according to Equations 30 and 31:

$$HL\_Qi\_min = -\sqrt{MVA_i^2 - MW_i^2} \quad \text{(Eq. 30)}$$

$$HL\_Qi\_max = \sqrt{MVA_i^2 - MW_i^2} \quad \text{(Eq. 31)}$$

For i={1,2}. The load rate is similarly computed according to Equation 32:

$$HL\_PV_{lsiBT} = \frac{HL\_MVAR_i - HL\_MVAR_{imin}}{HL\_MVAR_{imax} - HL\_MVAR_{imin}} \quad \text{(Eq. 32)}$$

Each OLTC's load sharing algorithm step then compares $HL\_PV_{lsiBT}$ with the average load rate (or load sharing set point) given by Equation 33:

$$HL\_SP_{lsR0} = \frac{\sum_{i=1}^{2} HL\_PV_{lsiBT}}{2} \quad \text{(Eq. 33)}$$

If each unit's load sharing process variable is different from the load sharing set point, a correction is carried out on each transformer according to Equation 34:

$$HL\_OUT_{Tlsi} = \begin{cases} HL\_OUT_{Tlsi(n-1)} - \theta_i \mid HL\_PV_{lsiBT} > HL\_SP_{lsR0} \\ HL\_OUT_{Tlsi(n-1)} + \theta_i \mid HL\_PV_{lsiBT} < HL\_SP_{lsR0} \end{cases} \quad \text{(Eq. 34)}$$

Where $HL\_OUT_{Tlsi}$ is the transformer's load sharing loop current scan output, $HL\_OUT_{Tlsi(n-1)}$ is the load sharing loop previous scan output and $\theta_i$ is a parametrically defined load sharing ramp.

The above specification provides a description of the manufacture and use of the disclosed compositions and methods. Since many embodiments can be made without departing from the spirit and scope of the invention, the invention resides in the claims.

What is claimed:
1. A method of controlling voltage of an electric power system, comprising: providing a system having:
   a high level substation; a low level substation connected to loads through step transformers; a voltage control module for each substation including a high voltage control module, a low voltage control module, on load tap controllers (OLTC), and turbo generators equipped with automatic voltage regulators; and a reactive power controller comprising a mega-volt-ampere reactive (VAR) export/import control module;
   determining the operating mode of the voltage control module based on an actual power network configuration across the high level substation and the low level substation;
   calculating a proportional-integral-derivative response of the high voltage control module from a deviation of a voltage variable of the high voltage control module to manipulate set points of the automatic voltage regulators; counteracting potentially destabilizing interactions between the high voltage control module and the low voltage control module by calculating a set point correction coefficient and sending the set point correction coefficient to the low level voltage control module; and controlling the low level voltage substation with a voltage control function;
   wherein the set points for the automatic voltage regulators connected to the high level substation are determined by: sensing a high level voltage for the high level substation;
   defining a first primary process control variable by constructing a function to calculate average high level bus voltage;
   using the primary process control variable to calculate a primary control output of the automatic voltage regulators; defining a second primary process control variable for the export/import control module; defining set points for the export/import control module;
   using the second primary process variable and the set points for the export/import control module to calculate a secondary control output of the automatic voltage regulators; and adding the primary control output and the secondary control output to obtain set points for the automatic voltage regulators.

2. The method of claim 1, wherein the set points for the automatic voltage regulators connected to the low level substation are determined by:
    sensing a low level voltage for the low level substation;
    using the low level voltage to define a primary process control variable;
    defining set points for the low level substation by using the set point correction coefficient sent to the low level voltage control module; and
    using the set points to calculate an automatic voltage regulator main control output.

3. The method of claim 1, wherein the step transformers connect the high level substation and the low level substation and minimize interaction between high voltage buses.

4. The method of claim 3, wherein the step transformers connect to a high level load and a low level load.

5. The method of claim 1, further comprising creating set points of the OLTC by:
    sensing a voltage and reactive power flow rate for the step transformers which connect the high level substation and the low level substation;
    defining a process control variable for the export/import control module;
    defining set points for the export/import control module;
    calculating an OLTC secondary control output;
    summing operator adjustable set points and the OLTC secondary control output;
    defining a set point correction coefficient to compute voltage control module set points; and
    defining an OLTC position for the step transformers when voltage exceeds the voltage control module set points.

6. The method of claim 1, further comprising proportionally sharing loads between step transformers operating in parallel by:
    sensing a reactive power flow rate of each of the step transformers;
    comparing the reactive power flow rates; and
    generating an OLTC control step to create smaller differences between the reactive power flow rates.

7. The method of claim 1, further comprising maintaining a predetermined relationship between the turbo generators by:
    sensing a reactive power flow rate of each turbo generator connected to a substation;
    calculating flow rate balancing parameters using the reactive power flow rate of each turbo generator connected to a substation;
    calculating an average of the flow rate balancing parameters; and
    manipulating the performance of the turbo generators to match the average of the flow rate balancing parameters.

8. The method of claim 1, further comprising executing a reactive power limiting control function by:
    sensing a reactive power flow rate of the step transformers;
    connecting the step transformers to a power grid;
    defining a reactive power flow set point within a predefined range; and
    defining an OLTC position for the step transformers when the reactive power flow rate exceeds reactive flow set point.

9. The method of claim 8, further comprising calculating "course" adjustments of the OLTC to limit an exchange of the reactive power with the power grid within an operator specified dead band.

10. The method of claim 5, further comprising calculating an overall response of the voltage control module from a deviation of a total voltage variable to manipulate the set points of the OLTC.

* * * * *